(12) United States Patent
Kim et al.

(10) Patent No.: US 12,289,695 B2
(45) Date of Patent: Apr. 29, 2025

(54) METHOD FOR PROVIDING TIME SYNCHRONIZATION SERVICE FOR 5G SYSTEM EXTERNAL APPLICATION SERVICE

(71) Applicant: Electronics and Telecommunications Research Institute, Daejeon (KR)

(72) Inventors: Changki Kim, Daejeon (KR); Yoo Hwa Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 275 days.

(21) Appl. No.: 17/499,125

(22) Filed: Oct. 12, 2021

(65) Prior Publication Data

US 2022/0361120 A1 Nov. 10, 2022

(30) Foreign Application Priority Data

| | | |
|---|---|---|
| May 4, 2021 | (KR) | 10-2021-0057608 |
| Aug. 9, 2021 | (KR) | 10-2021-0104326 |
| Sep. 23, 2021 | (KR) | 10-2021-0125451 |

(51) Int. Cl.
*H04J 3/06* (2006.01)
*H04W 56/00* (2009.01)

(52) U.S. Cl.
CPC .................... *H04W 56/001* (2013.01)

(58) Field of Classification Search
CPC .................... H04W 56/00; H04W 56/001
See application file for complete search history.

(56) References Cited

U.S. PATENT DOCUMENTS

| | | | |
|---|---|---|---|
| 2017/0350984 A1* | 12/2017 | Nishi | ............ G04G 3/02 |
| 2020/0128503 A1* | 4/2020 | Li | ............ H04W 12/06 |
| 2020/0329441 A1 | 10/2020 | Ha et al. | |
| 2020/0404697 A1 | 12/2020 | Yang et al. | |
| 2021/0105192 A1 | 4/2021 | Kahn et al. | |
| 2021/0105196 A1* | 4/2021 | Dao | ............ H04L 43/026 |
| 2021/0367695 A1* | 11/2021 | Moon | ............ H04J 3/0667 |
| 2022/0303804 A1* | 9/2022 | Ha | ............ H04W 24/08 |
| 2023/0155709 A1* | 5/2023 | Speicher | ............ H04J 3/0667 370/503 |

(Continued)

FOREIGN PATENT DOCUMENTS

| | | | | |
|---|---|---|---|---|
| GR | 20200100230 | * | 5/2020 | |
| KR | 10-2021-0021872 A | | 3/2021 | |
| WO | WO-2019197426 A1 | * | 10/2019 | ............ H04L 41/00 |

OTHER PUBLICATIONS

3GPP TSG-WG SA2 Meeting #144E e-meeting S2-2102599 Elbonia, Apr. 12-16, 2021 (Year: 2021).*

(Continued)

*Primary Examiner* — Edan Orgad
*Assistant Examiner* — Hidayat Dabiri
(74) *Attorney, Agent, or Firm* — NSIP Law

(57) ABSTRACT

Provided is a method for providing a time synchronization service for an external application service of a 5G system (5GS). A method may include: receiving, by a Network Exposure Function (NEF) from an Application Function (AF), a request for a capability for a 5GS time synchronization service; and in response to the request for the capability, transmitting, by the NEF to the AF, a time synchronization parameter including the capability.

6 Claims, 9 Drawing Sheets

(56) References Cited

U.S. PATENT DOCUMENTS

2023/0180157 A1\* 6/2023 Chandramouli .... H04W 56/001
 370/350
2023/0284166 A1\* 9/2023 Kolding ............ H04W 56/0015
 370/503

OTHER PUBLICATIONS

"3rd Generation Partnership Project; Technical Specification Group Services and System Aspects; Procedures for the 5G System (5GS); Stage 2 (Release 17)", *3GPP TS 23.502 V17.0.0*, Mar. 2021 (pp. 1-637).
"Time synchronization service exposure", *3GPP TSG-SA2 Meeting #145E*, May 17-May 28, 2021 (pp. 1-24).
"Updating time synchronization parameters", *3GPP TSG-SA WG2 Meeting #145E S2-2104533*, May 17-28, 2021 (pp. 1-2).

\* cited by examiner

FIG. 3

| Time Synchronization Parameter | Description |
|---|---|
| Time Synchronization distribution method | Identifies the time synchronization distribution methods supported by 5GS. |
| (g)PTP grandmaster capable | Indicates separately whether NW-TT supports acting as a gPTP or PTPgrandmaster. |
| 5G AS Clock quality | Indicates the clock quality supported in case of Access Stratum-based 5G clock sync |
| 5G Clock accuracy | Indicates an upper bound for the synchronicity accuracy budget supported by the 5G Clock |
| PTP Profile | Identifies the PTP profiles supported by 5GS |

A { (5G AS Clock quality, 5G Clock accuracy, PTP Profile)

FIG. 4

| Time Synchronization Parameter | Description |
|---|---|
| Time Synchronization distribution method | Identifies the time synchronization distribution methods requested by AF. |
| Grandmaster enabled | Indicates whether AF requests 5GS to act as a grandmaster for PTP or gPTP |
| Grandmaster priority | Indicates a priority used as defaultDS. priority1 when generating Announce message when 5GS acts as (g)PTP GM. |
| Time Domain | Defined in IEEE Std. 1588 |
| Temporal validity condition | This attribute is provided in the form of time interval(s) or duration(s) |
| Spatial validity condition | Indicates geographic areas of validity of UE for the time synchronization service |
| Time synchronization accuracy | Indicates the time synchronization accuracy requirement for the time synchronization service |
| PTP Profile | Identifies the PTP profile requested by AF |

B { (Temporal validity condition, Spatial validity condition, Time synchronization accuracy, PTP Profile)

METHOD FOR PROVIDING TIME SYNCHRONIZATION SERVICE FOR 5G SYSTEM EXTERNAL APPLICATION SERVICE

CROSS-REFERENCE TO RELATED APPLICATION

This application claims priority to and the benefit of Korean Patent Application No. 10-2021-0057608 filed in the Korean Intellectual Property Office on May 4, 2021, Korean Patent Application No. 10-2021-0104326 filed in the Korean Intellectual Property Office on Aug. 9, 2021, and Korean Patent Application No. 10-2021-0125451 filed in the Korean Intellectual Property Office on Sep. 23, 2021, the entire contents of which are incorporated herein by reference.

BACKGROUND OF THE DISCLOSURE

(a) Field of the Disclosure

The present disclosure relates to a method for providing a time synchronization service for an external application service of a 5G system (5GS), specifically, in order for the 5GS to provide a Time Sensitive Communication (TSC) interworking with a Non Time Sensitive Networking (Non-TSN), a method in which a Network Exposure Function (NEF) and a TSC Time Synchronization Function (TSCTSF) of the 5GS work with an Application Function (AF) to provide a time synchronization service.

(b) Description of the Related Art

In 3rd Generation Partnership Project (3GPP) SA2, in order to meet the requirements for the application of various vertical industries of the 5G system, standardization for the 5G system supporting TSC has begun in Rel-16. According to 3GPP TS 23.501 (Rel-16), the 5GS is defined as one logical TSN bridge and only supports interworking with IEEE TSN. After that, in Rel-17, study work (TR23.700-20) and standardization are in progress to accommodate a time sensitive application services in an environment interworking with Non-TSN, and to further provide a time synchronization service for the purpose.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a method for providing a time synchronization service for an external application service of a 5G system (5GS) capable of extending time synchronization parameters transmitted between the 5GS (a NEF) and an AF and inside the 5GS (between a NEF and a TSCTSF) and transmitting the extended time synchronization parameters in order to provide a 5GS time synchronization service to application services outside of the 5GS in a Non-TSN network environment.

An example embodiment of the present disclosure provides a method for providing a time synchronization service for an external application service of a 5G system (5GS), including: receiving, by a Network Exposure Function (NEF) from an Application Function (AF), a request for a capability for a 5GS time synchronization service; and in response to the request for the capability, transmitting, by the NEF to the AF, a time synchronization parameter containing the capability.

According to an embodiment of the present disclosure, the time synchronization parameter may be transmitted using a Nnef_ParameterProvision service interface between the NEF and the AF.

According to an embodiment of the present disclosure, the request for the capability and the response may be transmitted using a Nnef_ParameterProvision_Get service operation between the NEF and the AF.

According to an embodiment of the present disclosure, the time synchronization parameter may include at least one of a 5G Clock accuracy, a Temporal validity condition, a Spatial validity condition, a Time synchronization accuracy and PTP Profiles.

An example embodiment of the present disclosure provides a method for providing a time synchronization service for an external application service of a 5GS, including: receiving, by a NEF from an AF, a request for creating, updating or deleting a 5GS time synchronization service requested by the external application service, through a time synchronization service parameter for providing a 5GS time synchronization service; and transmitting, by the NEF to the AF, a response to the request for creating, updating or deleting.

According to an embodiment of the present disclosure, the time synchronization service parameter may be transmitted using a Nnef_ParameterProvision service interface between the NEF and the AF.

According to an embodiment of the present disclosure, the request for creating, updating or deleting and response may be transmitted using a Nnef_ParameterProvision_Create, Nnef_ParameterProvision_Update, or Nnef_ParameterProvision_Delete service operation between the NEF and the AF.

According to an embodiment of the present disclosure, the time synchronization service parameter may include at least one of a 5G Clock accuracy, a Temporal validity condition, a Spatial validity condition, a Time synchronization accuracy and a PTP Profile.

An example embodiment of the present disclosure provides a method for providing a time synchronization service for an external application service of a 5GS, including: receiving, by a NEF from an AF, a subscription request a capability of a 5GS time synchronization service; transmitting, by the NEF to a Time Sensitive Communication Time Synchronization Function (TSCTSF), the subscription request for the capability; receiving, by the NEF from the TSCTSF, a time synchronization capability parameter containing the capability; and transmitting, by the NEF to the AF, the time synchronization capability parameter containing the capability received from the TSCTSF.

According to an embodiment of the present disclosure, the time synchronization capability parameter between the NEF and the TSCTSF may be transmitted using a Ntsctsf_TimeSyncCaps service interface, and the time synchronization capability parameter between the NEF and the AF may be transmitted using a Nnef_TimeSyncCaps service interface.

According to an embodiment of the present disclosure, the time synchronization capability parameter may include at least one of a 5G Clock accuracy, a Temporal validity condition, a Spatial validity condition, a Time synchronization accuracy and PTP Profiles.

An example embodiment of the present disclosure provides a method for providing a time synchronization service for an external application service of a 5GS, including: receiving, by a NEF from an AF, a time synchronization service parameter for configuring the 5GS time synchronization service requested by the external application service; transmitting, by the NEF to a TSCTSF, the time synchronization service parameter for configuring; receiving, by the NEF from the TSCTSF, a response to the request for configuring; and transmitting, by the NEF to the AF, a response to the request for configuring.

According to an embodiment of the present disclosure, the time synchronization service parameter for configuring the 5GS time synchronization service between the NEF and the TSCTSF may be transmitted using a Ntsctsf_TimeSyncConfig service interface and the time synchronization service parameter for configuring the 5GS time synchronization service between the NEF and the AF may be transmitted using a Nnef_TimeSyncConfig service interface.

According to an embodiment of the present disclosure, the time synchronization service parameter may include at least one of a 5G Clock accuracy, a Temporal validity condition, a Spatial validity condition, a Time synchronization accuracy and a PTP Profile.

According to an embodiment of the present disclosure, the method further includes: receiving, by the NEF from the TSCTSF, a time synchronization service parameter containing a notification of updated state of the 5GS time synchronization service configuration; and transmitting, by the NEF to the AF, the time synchronization service parameter containing the notification of updated state of the 5GS time synchronization service configuration received from the TSCTSF.

According to an embodiment of the present disclosure, the time synchronization service parameter between the NEF and the TSCTSF may be transmitted using a Ntsctsf_TimeSyncConfig service interface, and the time synchronization service parameter between the NEF and the AF may be transmitted using a Nnef_TimeSyncConfig service interface.

BRIEF DESCRIPTION OF THE DRAWINGS

FIG. 3 illustrates time synchronization parameters transmitted between a 5GS and an AF and inside the 5GS (between a NEF and a TSCTSF) when a time synchronization service is exposed according to an embodiment of the present disclosure.

FIG. 4 illustrates time synchronization parameters transmitted between a 5GS and an AF and inside the 5GS (between a NEF and a TSCTSF) when a time synchronization service requirement is created or updated to 5GS according to an embodiment of the present disclosure.

DETAILED DESCRIPTION OF THE EMBODIMENTS

Figure 1:
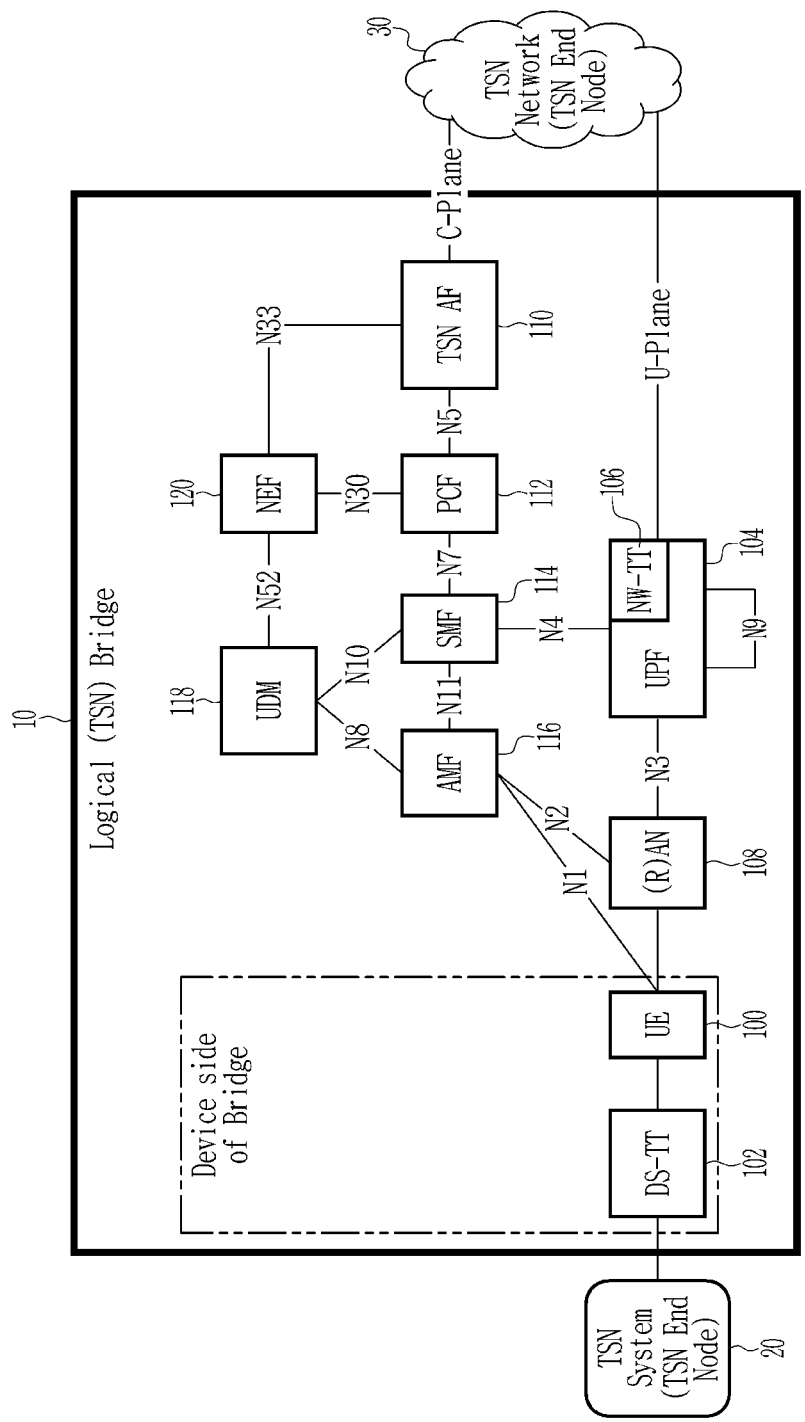
FIG. 1 illustrates a 5GS architecture supporting a TSC and a time synchronization service interworking with a TSN network.

Hereinafter, embodiments of the present disclosure will be described in detail with reference to the accompanying drawings so that those of ordinary skill in the art may easily implement the present disclosure. However, the present disclosure may be implemented in various different ways and is not limited to the embodiments described herein.

In the drawings, parts irrelevant to the description are omitted in order to clearly describe the present disclosure, and like reference numerals are assigned to like elements throughout the specification.

Throughout the specification and claims, unless explicitly described to the contrary, the word "comprise", and variations such as "comprises" or "comprising", will be understood to imply the inclusion of stated elements but not the exclusion of any other elements.

FIG. 1 illustrates a 5GS architecture supporting a TSC and a time synchronization service interworking with a TSN network.

Referring to FIG. 1, a 5GS architecture supporting a TSC and a time synchronization services interworking with a TSN network may include a 5G system 10 operating as a logical TSN bridge, and a TSN system 20 and a TSN network 30 as TSN end nodes that exchange data and communicate with each other using the 5G system 10 as a TSN bridge.

That is, the architecture of FIG. 1 is an architecture extended to support a TSC in the 5G system 10. The 5G system 10 operates as a TSN bridge for integration with an external TSN network, and translators (TTs) 102, 106 and a TSN Application Function (TSN AF) 10 are added to the architecture including the existing a UE 100, an User Plane Function (UPF) 104, a Radio Access Network (RAN) 108, a Policy Control Function (PCF) 112, a SMF 114, an Access and Mobility Management Function (AMF) 116, a Unified Data Management (UDM) 118 and a Network Exposure Function (NEF) 120 for communication with the TSN network. The TSN translators 102, 106 for interworking with the TSN network may include a DS-TT 102 and a NW-TT 106, and each DS-TT 102 and NW-TT 106 has ports for transmitting or receiving traffics for communication with the TSN network. In addition to the translators in a User Plane, the TSN AF 110 in a Control Plane communicates with a Centralized Network Configuration (CNC) of the TSN network to transmit and receive control information between the 5G system and the TSN network, and the NEF 120 has a function of exposing services to the 5G network.

Figure 2:
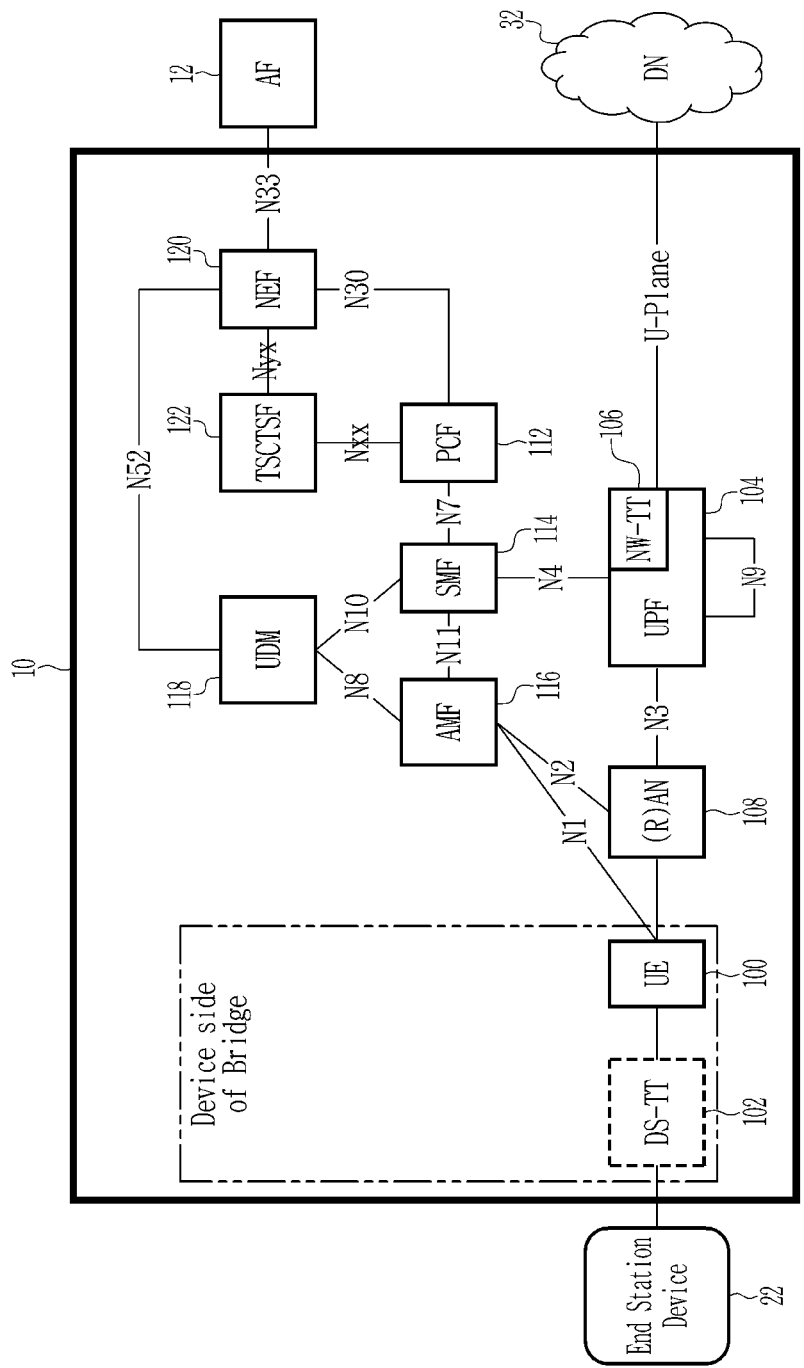
FIG. 2 illustrates a 5GS architecture supporting a TSC and a time synchronization service interworking with a Non-TSN network using a NEF and a TSCTSF according to an embodiment of the present disclosure.

FIG. 2 illustrates a 5GS architecture supporting a TSC and a time synchronization service interworking with a Non-TSN network using a NEF and a TSCTSF according to an embodiment of the present disclosure.

Referring to FIG. 2, a 5GS architecture supporting a TSC and a time synchronization service interworking with a Non-TSN network is an extension of the 5GS architecture of the TSN network interworking structure of FIG. 1, in order to support a time synchronization service of the 5GS to application services in the interworking environment with the Non-TSN and provide a TSC service using it.

To this end, a function for the 5GS to expose the time synchronization service to the external application service and a function for the application services to provision each time synchronization service requirement to 5GS are provided. In addition, the external application service may obtain the 5GS time synchronization capability exposed from the NEF 120 of the 5GS through the AF 12, and a function is also provided that allows the time synchronization requirement required by the service to be set to the 5GS through the NEF 120 within the range of the capability exposed by the 5GS.

For this, the 5GS structure may be a structure in which the 5GS time synchronization service function is separated from the NEF 120 with the exposure function, and the TSCTSF 122, which is a functional entity dedicated to the time synchronization service, as shown in FIG. 2. That is, the exposure function is performed by the NEF 120, and the function of providing the time synchronization service is performed by the TSCTSF 122, so that the function is separated.

In this architecture, the time synchronization parameters used between the NEF 120 and the AF 12, and between the TSCTSF 122 and the NEF 120 will be described with reference to FIG. 3 and FIG. 4.

FIG. 3 illustrates time synchronization parameters transmitted between a 5GS and an AF and inside the 5GS (between a NEF and a TSCTSF) when a time synchronization service is exposed according to an embodiment of the present disclosure, and FIG. 4 illustrates time synchronization parameters transmitted between a 5GS and an AF and inside the 5GS (between a NEF and a TSCTSF) when a time synchronization service requirement is created or updated to 5GS according to an embodiment of the present disclosure.

Referring to FIG. 3, as time synchronization parameters exposed by the NEF for the AF, there have been a Time synchronization distribution method, a (g)PTP grandmaster capable, and a 5G AS Clock quality. Here, Time synchronization distribution method is a parameter to identify the time synchronization distribution method supported by 5GS, the (g)PTP grandmaster capable is a parameter for whether NW-TT supports gPTP or PTP GM (Grandmaster) role, and the 5G AS Clock quality is a parameter for the clock quality of the supported Access Stratum-based 5G clock (5G internal clock) sync.

Next, referring to FIG. 4, as time synchronization parameters input from the AF to the NEF, there have been a Time synchronization distribution method, a Grandmaster enabled, a Grandmaster priority, and a Time Domain. Here, the Time synchronization distribution method is a parameter to identify the time synchronization distribution method requested by the AF, the Grandmaster enabled is a parameter for whether or not to request the 5GS to act as a GM of PTP or gPTP according to the time synchronization distribution method requested by the AF, the Grandmaster priority is a parameter indicating the priority used as defaultDS.priority1 when generating an Announce message when the 5GS operates as a (g)PTP GM, and the Time Domain is a parameter as defined in IEEE Std 1588.

However, according to the description of these parameters, conventional 5GS provides time synchronization parameters transmitted between the NEF and the AF for exposure and configuring of the 5GS time synchronization services to external application services by interworking with the Non-TSN network, but some information for providing a complete time synchronization service is not included.

Hereinafter, when the 5GS provides a 5GS time synchronization service to the external application service by interworking with the Non-TSN network, by the NEF 120 exposing to the AF 12 the time synchronization service information expressed in extended time synchronization parameters which can be supported by the 5GS, and the AF 12 configuring the time synchronization service information expressed in extended time synchronization parameters necessary for the application service through the NEF 120, a method for allowing application services outside of the 5GS to use the desired 5GS time synchronization service will be described.

In order for the 5GS to provide the 5GS time synchronization services to external application services, it is possible to provide exposure and configuring functions for the time synchronization service between the 5GS (the NEF 120) and the AF and inside the 5GS (between the NEF 120 and the TSCTSF 122), in addition, by including the extended time synchronization parameter with information of the Temporal validity condition, the Spatial validity condition, the Time synchronization accuracy, and the PTP Profile added to the conventional time synchronization parameter transmitted between the TSCTSF, the NEF and the AF, it is possible to provide and utilize various and detailed time synchronization services.

Now, referring back to FIG. 3 and FIG. 4, an extended time synchronization parameters transmitted between the NEF 120, the TSCTSF 122 and the AF 12 according to an embodiment of the present disclosure will be described.

FIG. 3 illustrates the extended time synchronization parameters transmitted between the 5GS (the NEF 120) and the AF and inside the 5GS (between the NEF 120 and a TSCTSF 122) when the 5GS exposes a time synchronization service of the 5GS to the AF 12, and FIG. 4 illustrates the extended time synchronization parameters transmitted between the 5GS (the NEF 120) and the AF and inside the 5GS (between the NEF 120 and a TSCTSF 122) when the application service create or update the time synchronization service requirement of the an application to the 5GS. Compared to the conventional time synchronization parameters, the Temporal validity condition, the Spatial validity condition, the Time synchronization accuracy, and the PTP Profile were added.

The 5G clock accuracy is a parameter for the upper bound of the synchronization accuracy supported by the 5GS time synchronization service, and the PTP Profile is a parameter indicating the PTP Profile supported by the 5GS time synchronization service (e.g., IEEE 1588 Default Profiles, IEEE Std 802.1AS Profile, SMPTE Profile, etc.). The Temporal validity condition is a parameter indicating a required period of the time synchronization service including start-time and stop-time, and the Spatial validity condition is a parameter indicating location information of a UE requiring the time synchronization service. The Time synchronization accuracy is a parameter for the synchronization accuracy of the time synchronization service required by the application service, and the PTP Profile is a parameter indicating the PTP Profile required by the application service, which corresponds to one of the supported PTP Profiles exposed in 5GS. In some embodiments of the present disclosure, the PTP Profile may include at least one of PTP Profiles defined in IEEE1588, IEEE802.1AS, SMPTE, and ITU-T.

Figure 5:
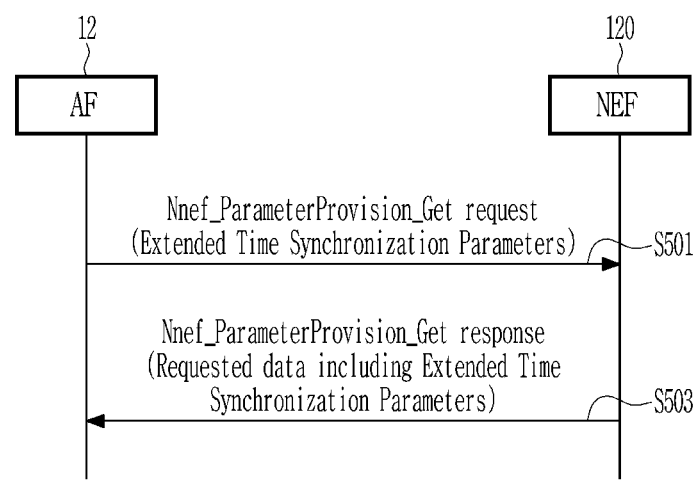
FIG. 5 illustrates a method in which an AF obtains a time synchronization service capability of a 5GS from a NEF through a Nnef_ParameterProvision service interface according to an embodiment of the present disclosure.
Figure 6:
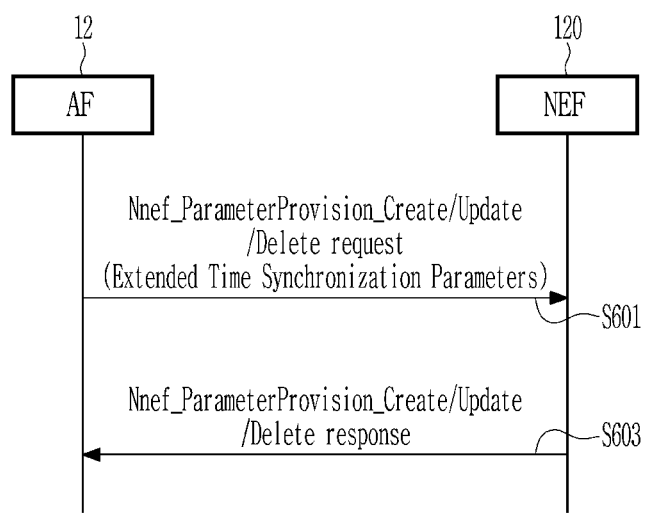
FIG. 6 illustrates a method in which an AF transmits a time synchronization service requirement of an application service to a 5GS through a Nnef_ParameterProvision service interface with a NEF according to an embodiment of the present disclosure.

FIG. 5 illustrates a method in which an AF obtains a time synchronization service capability of a 5GS from a NEF through a Nnef_ParameterProvision service interface according to an embodiment of the present disclosure, and FIG. 6 illustrates a method in which an AF transmits a time synchronization service requirement of an application service to a 5GS through a Nnef_ParameterProvision service interface with a NEF according to an embodiment of the present disclosure.

FIG. 5 is a procedure in which the AF 12 obtains the time synchronization service capability of the 5GS from the NEF 120 through the Nnef_ParameterProvision service interface. At this time, the AF 12 transmits the Nnef_ParameterProvision_Get request including the extended time synchronization parameter that it wants to know to the NEF 120, and the NEF 120 transmits the Nnef_ParameterProvision_Get response including the extended time synchronization parameter contained capability of the 5GS time synchronization parameter.

FIG. 6 is a procedure in which the AF 12 transmits the time synchronization service requirement of the application service to the 5GS through the Nnef_ParameterProvision service interface with the NEF 120. At this time, the AF 12 transmits the Nnef_ParameterProvision_Create request, Nnef_ParameterProvision_Update request or Nnef_ParameterProvision_Delete request to the NEF 120 including the extended time synchronization parameters for creation/update/deletion of the time synchronization service reflecting the time synchronization service requirements of the application service, and the NEF 120 applies this to the 5GS. Thereafter, the NEF 120 transmits the result to the AF 12 through the Nnef_ParameterProvision_Create response, the Nnef_ParameterProvision_Update response, or the Nnef_ParameterProvision_Delete response.

Figure 7:
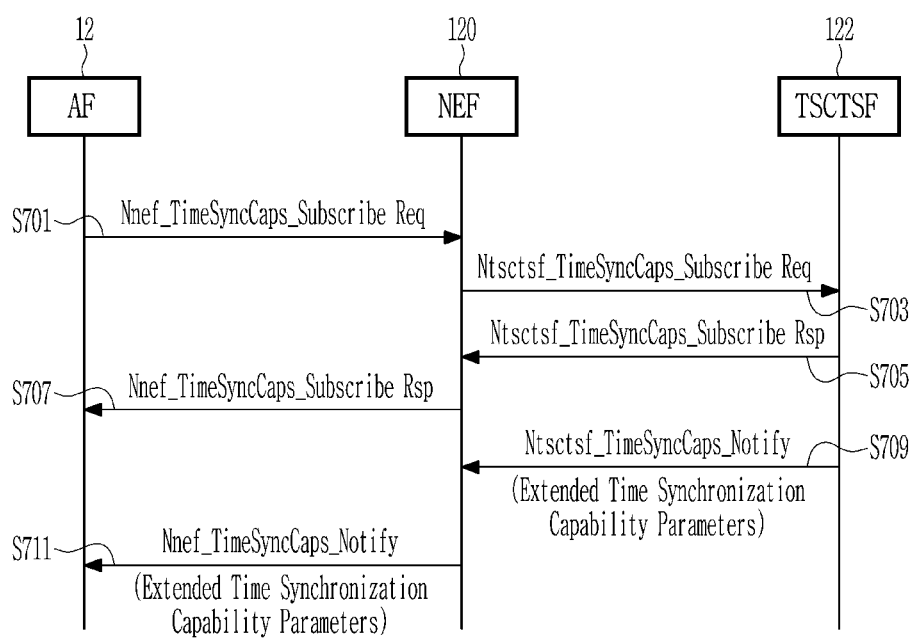
FIG. 7 illustrates a method in which an AF obtains a time synchronization service capability of a 5GS through a Nnef_TimeSyncCaps and a Ntsctsf_TimeSyncCaps service interfaces with a NEF and a TSCTSF according to another embodiment of the present disclosure.
Figure 8:
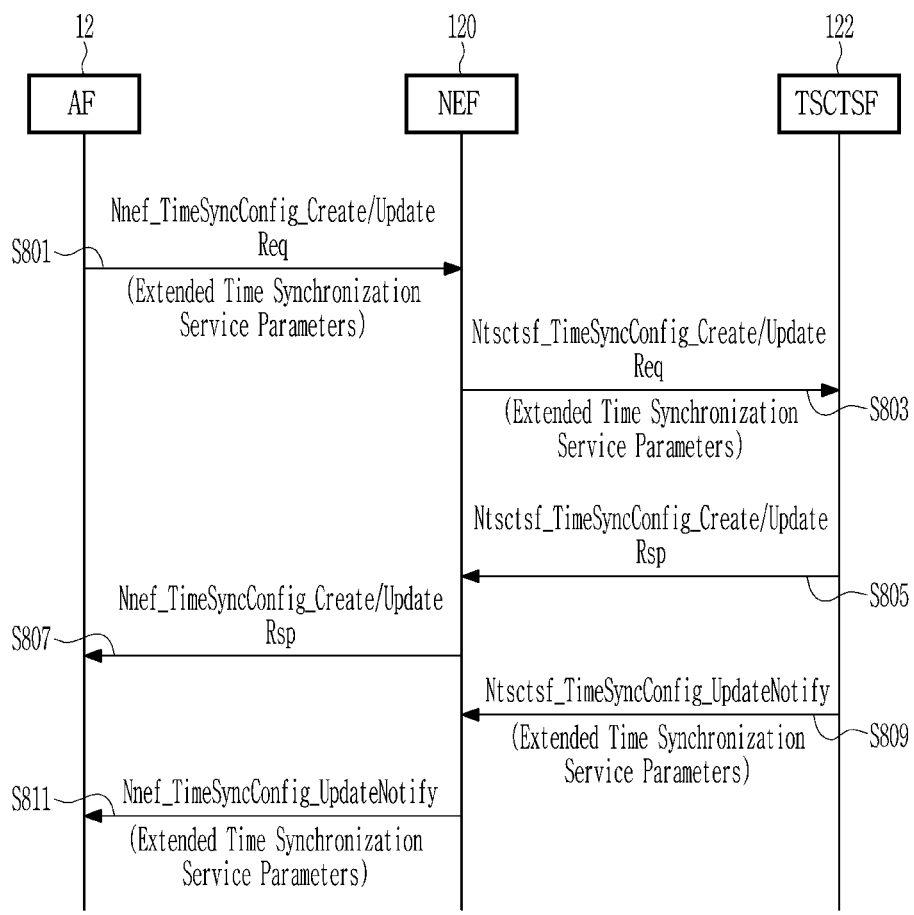
FIG. 8 illustrates a method in which an AF configures and updates a time synchronization service of an application service through a Nnef_TimeSyncConfig and a Ntsctsf_TimeSyncConfig service interfaces with a NEF and a TSCTSF according to another embodiment of the present disclosure.

FIG. 7 illustrates a method in which an AF obtains a time synchronization service capability of a 5GS through a Nnef_TimeSyncCaps and a Ntscts_TimeSyncCaps service interfaces with a NEF and a TSCTSF according to another embodiment of the present disclosure, and FIG. 8 illustrates a method in which an AF configures and updates a time synchronization service of an application service through a Nnef_TimeSyncConfig and a Ntscts_TimeSyncConfig service interfaces with a NEF and a TSCTSF according to another embodiment of the present disclosure.

FIG. 7 is a service operation procedure of the NEF 120 and the TSCTSF 122 including the extended time synchronization parameters. First, the AF 12 subscribes to the time synchronization information request to 5GS together with the target UE list to obtain time synchronization capability for the target UEs (Nnef_TimeSyncCaps_Subscribe Request/Response and Ntscts_TimeSyncCaps_Subscribe Request/Response), then the NEF 120 and the TSCTSF 122 transmit the extended time synchronization capability parameter including the time synchronization capability of the 5GS to the AF through the Nnef_TimeSyncCaps_Notify service interface.

FIG. 8 is a service operation procedure of the NEF 120 and the TSCTSF 122 when the AF 12 receives the 5GS time synchronization capability of the corresponding UE from the NEF 120 and then configures the time synchronization service of the application service by referring to it. The AF 12 first transmits the extended time synchronization service parameters to the NEF 120 and the TSCTSF 122 (Nnef_TimeSyncConfig_Create/Update Request/Response and Ntscts_TimeSyncConfig_Create/Update Request/Response). In this case, the 'Update' operation is used after being created through 'Create' operation. In addition, even when an update in the 5GS time synchronization service configuration occurs, the TSCTSF 122 and the NEF 120 notify the AF 12 of the update including the synchronzation parameter (Nnef_TimeSyncConfig_UpdateNotify and Ntsctsf_TimeSyncConfig_UpdateNotify).

Figure 9:
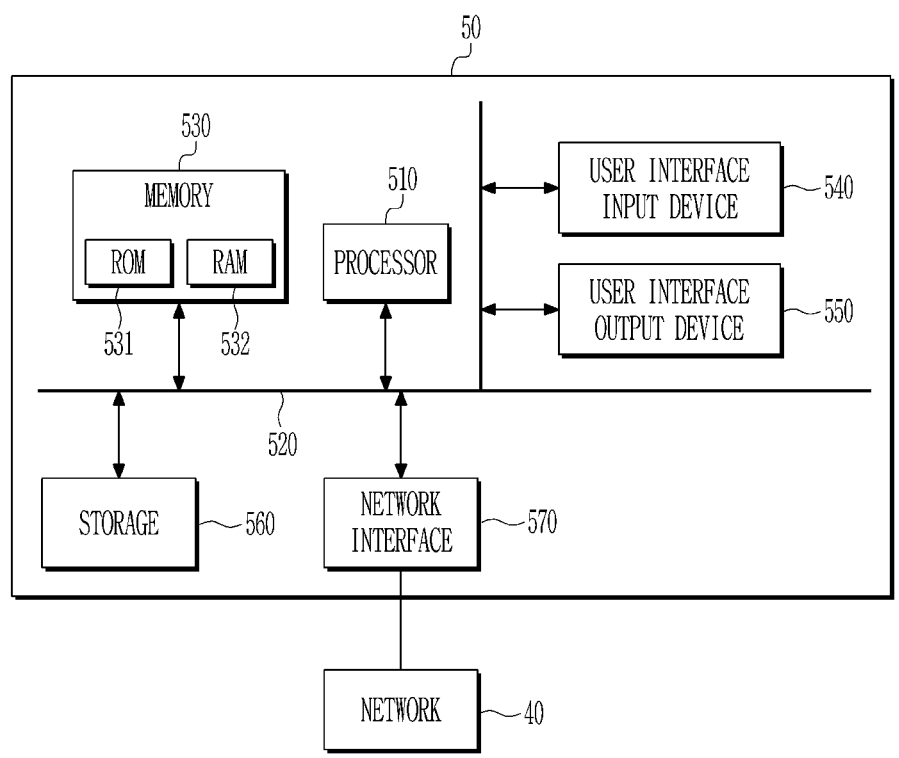
FIG. 9 is a block diagram illustrating a computing device according to an embodiment of the present disclosure.

FIG. 9 is a block diagram illustrating a computing device according to an embodiment of the present disclosure.

Referring to FIG. 9, a computing device 50 may be a network entity of a 5G system, for example, UE 100, DS-TT 102, UPF 104, NW-TT 106, RAN 108, TSN AF 110, PCF 112, SMF 114, AMF 116, UDM 118, NEF 120, TSCTSF 122, and the like. Also, a method for providing a time synchronization service for an external application service of a 5GS according to embodiments of the present disclosure may be implemented using the computing device 50.

The computing device 50 includes at least one of a processor 510, a memory 530, a user interface input device 540, a user interface output device 550, and a storage device 560 communicating through a bus 520. The computing device 50 may also include a network 40, such as a network interface 570 that is electrically connected to a wireless network. The network interface 570 may transmit or receive signals with other entities through the network 40.

The processor 510 may be implemented in various types such as an application processor (AP), a central processing unit (CPU), and a graphic processing unit (GPU), and may be any semiconductor device which executes instructions stored in the memory 530 or the storage device 560. The processor 510 may be configured to implement the functions and methods described in FIG. 1 to FIG. 8.

The memory 530 and the storage device 560 may include various types of volatile or nonvolatile storage media. For example, the memory may include read-only memory (ROM) 531 and random access memory (RAM) 532. In an embodiment of the present disclosure, the memory 530 may be located inside or outside the processor 510, and the memory 530 may be connected to the processor 510 through various known means.

In addition, a method for providing a time synchronization service for an external application service of a 5GS according to embodiments of the present disclosure may be implemented as a program or software executed on the computing device 50, and the program or software may be stored in a computer-readable medium.

In addition, a method for providing a time synchronization service for an external application service of a 5GS according to embodiments of the present disclosure may be implemented with hardware that can be electrically connected to the computing device 50.

According to the embodiments of the present disclosure described so far, when the 5GS provides a time synchronization service to an external application service interworking with the Non-TSN network, by extending the time synchronization parameter transmitted between the 5GS (the NEF) and the AF and inside the 5GS (between the NEF and the TSCTSF), the 5GS can provide various time synchronization services to the external application services, and external application services can use various time synchronization services and TSC services supported by these 5GS.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A method performed by a Network Exposure Function (NEF) for providing a time synchronization service for an external application service of a 5GS, the method comprising:

receiving, from an Application Function (AF), a request for a capability of a 5GS time synchronization service; and transmitting, to the AF, a time synchronization capability parameter for a capability of a 5GS time synchronization service using Nnef_TimeSyncCaps service operation, in response to the request, wherein the time synchronization capability parameter comprises PTP profiles, a Temporal validity condition, and a Spatial validity condition, wherein the PTP profiles comprise a parameter indicating supported PTP Profiles list exposed in the 5GS, wherein the Temporal validity condition comprises a parameter indicating a required period of the time synchronization service including start-time and stop-time, and wherein the Spatial validity condition comprises a parameter indicating location information of a UE requiring the time synchronization service.

2. A method performed by a Network Exposure Function (NEF) for providing a time synchronization service for an external application service of a 5GS, the method comprising:

receiving, from an Application Function (AF), a request including a time synchronization service parameter for configuring the 5G time synchronization service requested by the external application service using Nnef_TimeSyncConfig service; and transmitting, to the AF, a response to the request for configuring the 5G time synchronization service, wherein the time synchronization service parameter comprises PTP profiles, a Temporal validity condition, and a Spatial validity condition, wherein the PTP profiles comprise a parameter indicating a PTP Profile required by an application service, which corresponds to one of a supported PTP Profiles exposed in the 5GS, wherein the Temporal validity condition comprises a parameter indicating a required period of the time synchronization service including start-time and stop-time, and wherein the Spatial validity condition comprises a parameter indicating location information of a UE requiring the time synchronization service.

3. The method of claim 1, wherein the time synchronization service parameter further comprises 5G clock accuracy, and Time synchronization accuracy, wherein the 5G clock accuracy comprises a parameter for an upper bound of a synchronization accuracy supported by the 5GS time synchronization service, and wherein the Time synchronization accuracy comprises a parameter for the synchronization accuracy of the time synchronization service required by the application service.

4. The method of claim 2, wherein the time synchronization service parameter further comprises 5G clock accuracy, and Time synchronization accuracy, wherein the 5G clock accuracy comprises a parameter for an upper bound of a synchronization accuracy supported by the 5GS time synchronization service, and wherein the Time synchronization accuracy comprises a parameter for the synchronization accuracy of the time synchronization service required by the application service.

5. An apparatus of Network Exposure Function (NEF) for providing a time synchronization service for an external application service of a 5GS, the apparatus comprising:

a memory; and a processor operably connected to the memory, wherein the processor is configured to:

receive, from an Application Function (AF), a request for a capability of a 5GS time synchronization service; and transmit, to the AF, a time synchronization capability parameter for a capability of a 5GS time synchronization service using Nnef_TimeSyncCaps service operation, in response to the request, wherein the time synchronization capability parameter comprises PTP profiles, a Temporal validity condition, and a Spatial validity condition, and wherein the PTP profiles comprise a parameter indicating supported PTP Profiles list exposed in the 5GS, wherein the Temporal validity condition comprises a parameter indicating a required period of the time synchronization service including start-time and stop-time, and wherein the Spatial validity condition comprises a parameter indicating location information of a UE requiring the time synchronization service.

6. The method of claim 5, wherein the time synchronization service parameter further comprises 5G clock accuracy, and Time synchronization accuracy, wherein the 5G clock accuracy comprises a parameter for an upper bound of a synchronization accuracy supported by the 5GS time synchronization service, and wherein the Time synchronization accuracy comprises a parameter for the synchronization accuracy of the time synchronization service required by the application service.

\* \* \* \* \*